Dec. 8, 1931.  E. P. BULLARD  1,835,591
AUTOMATIC WORK FEEDING AND CHUCKING MEANS FOR MULTIPLE SPINDLE LATHES
Filed Dec. 5, 1929  7 Sheets-Sheet 1

INVENTOR.
Edward P. Bullard
BY
Chamberlain + Neuman
ATTORNEYS.

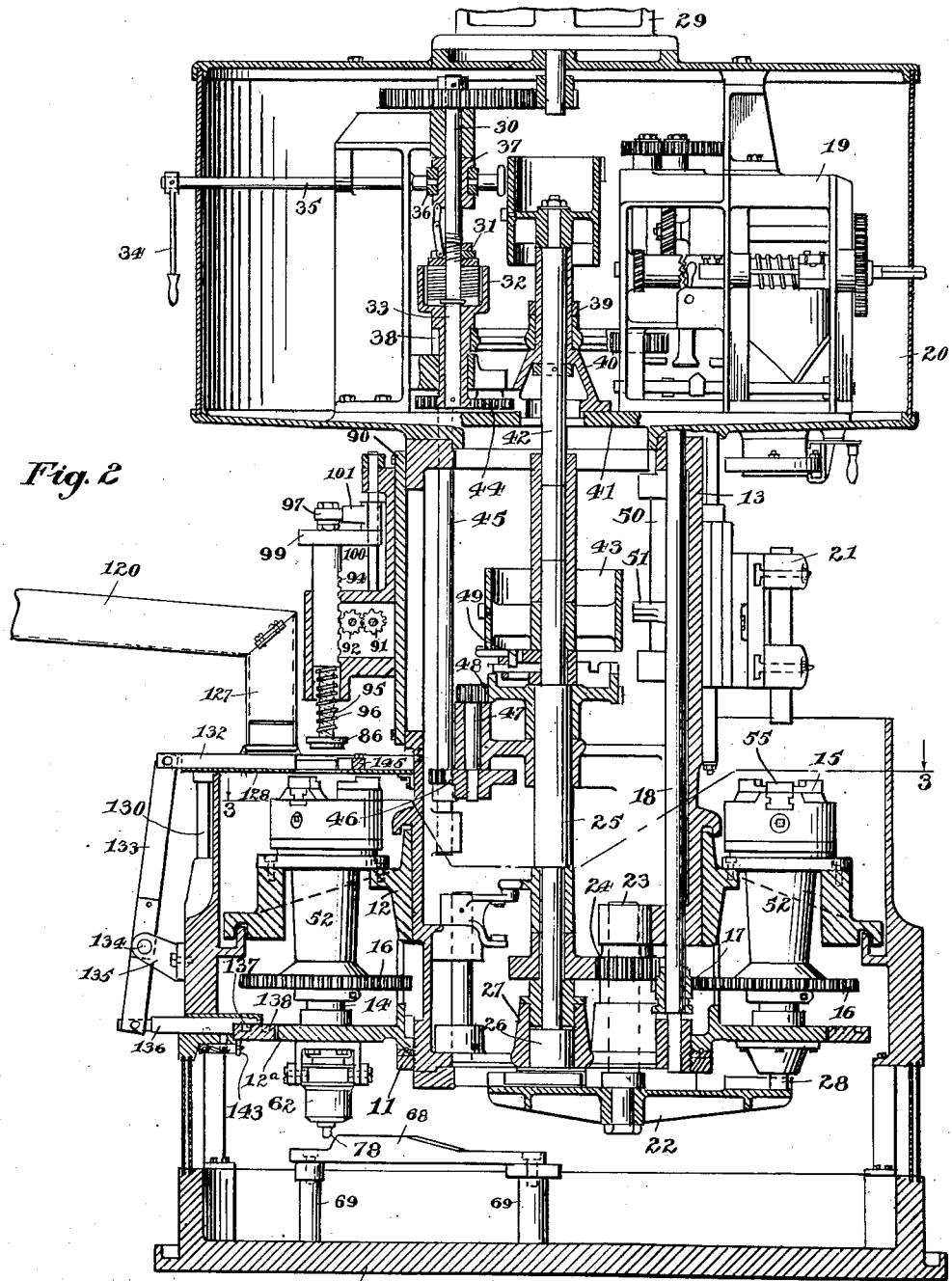

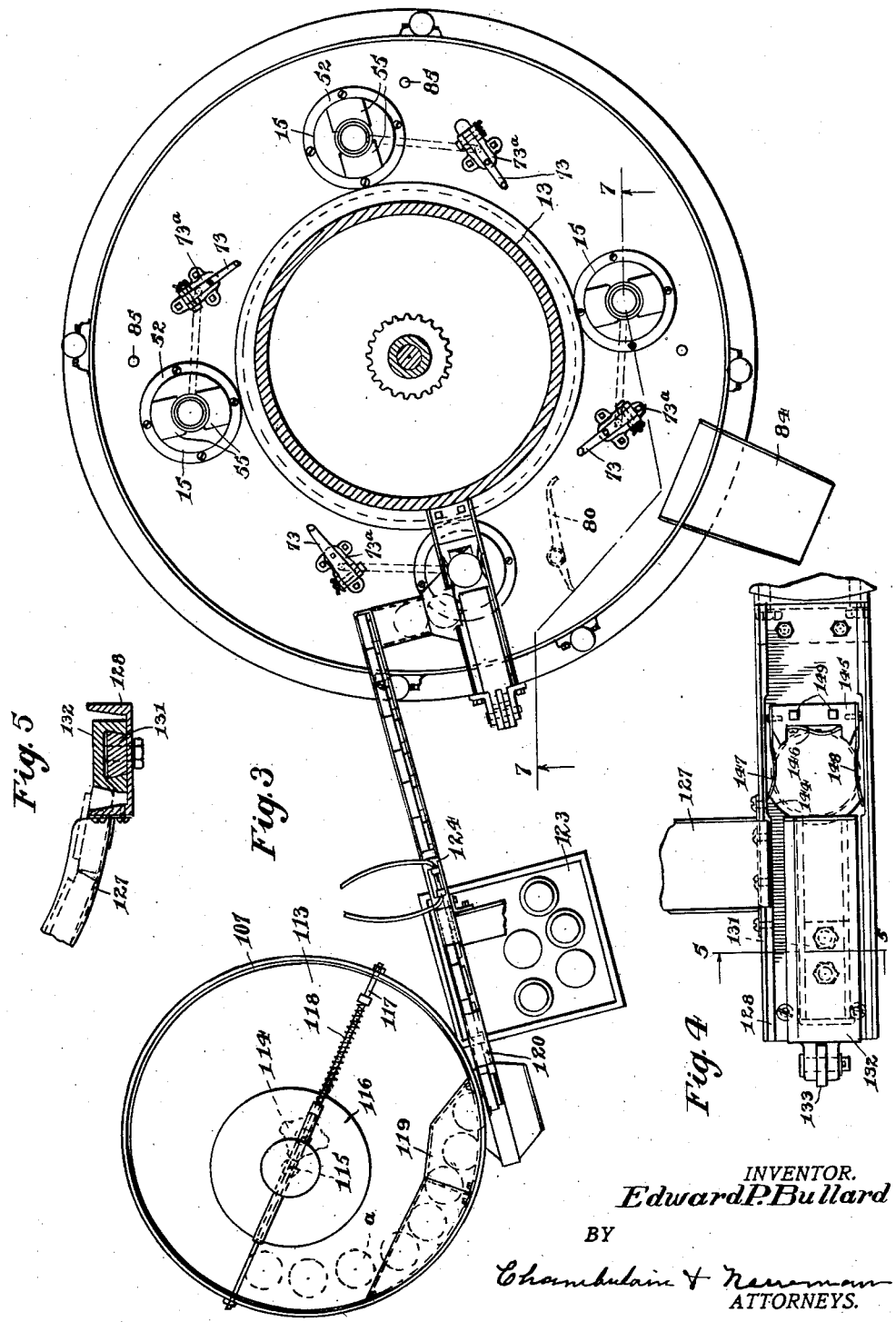

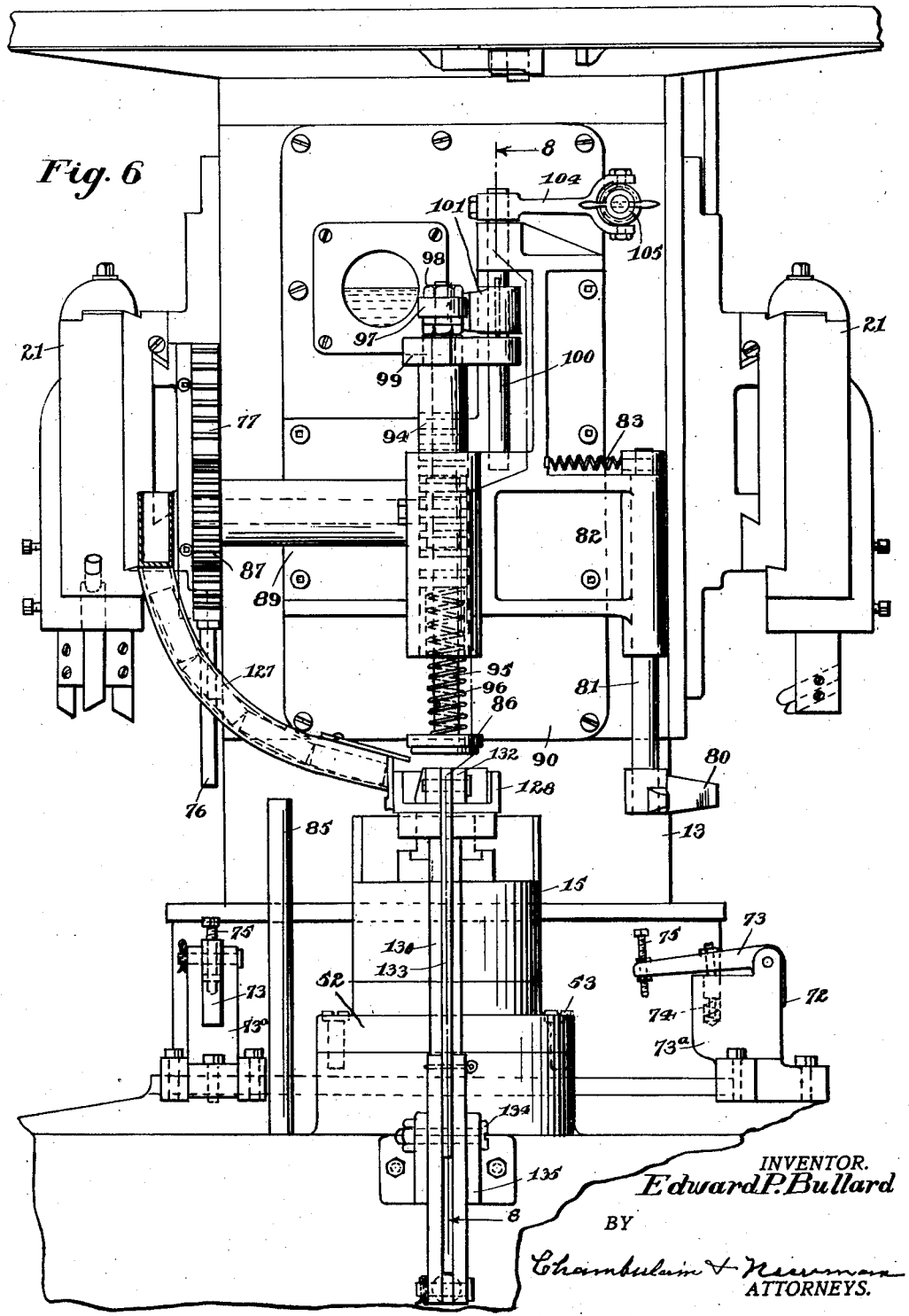

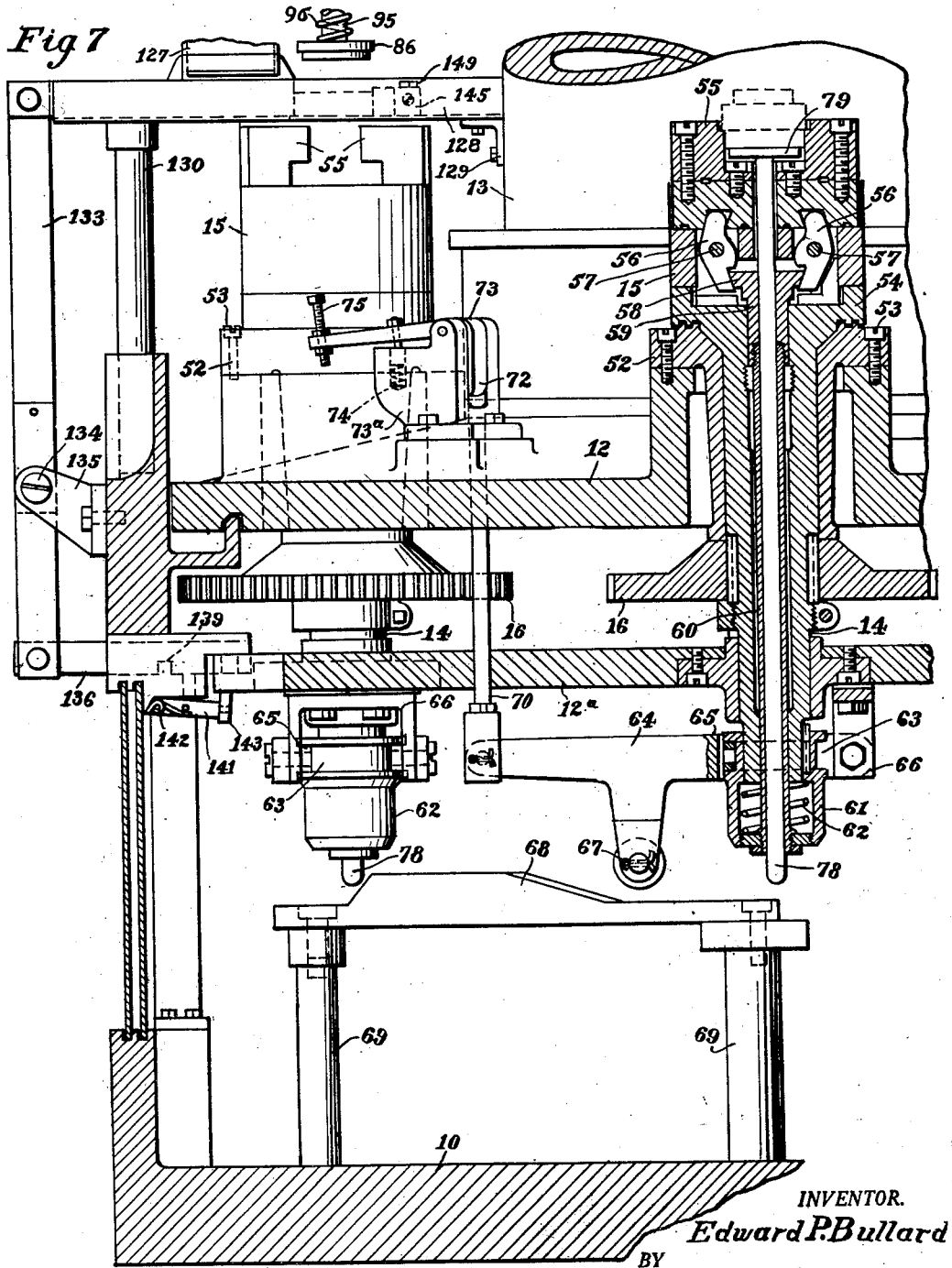

Dec. 8, 1931.  E. P. BULLARD  1,835,591
AUTOMATIC WORK FEEDING AND CHUCKING MEANS FOR MULTIPLE SPINDLE LATHES
Filed Dec. 5, 1929  7 Sheets-Sheet 6

INVENTOR.
Edward P. Bullard
BY
Chamberlain & Newman
ATTORNEYS.

Dec. 8, 1931.   E. P. BULLARD   1,835,591
AUTOMATIC WORK FEEDING AND CHUCKING MEANS FOR MULTIPLE SPINDLE LATHES
Filed Dec. 5, 1929   7 Sheets-Sheet 7
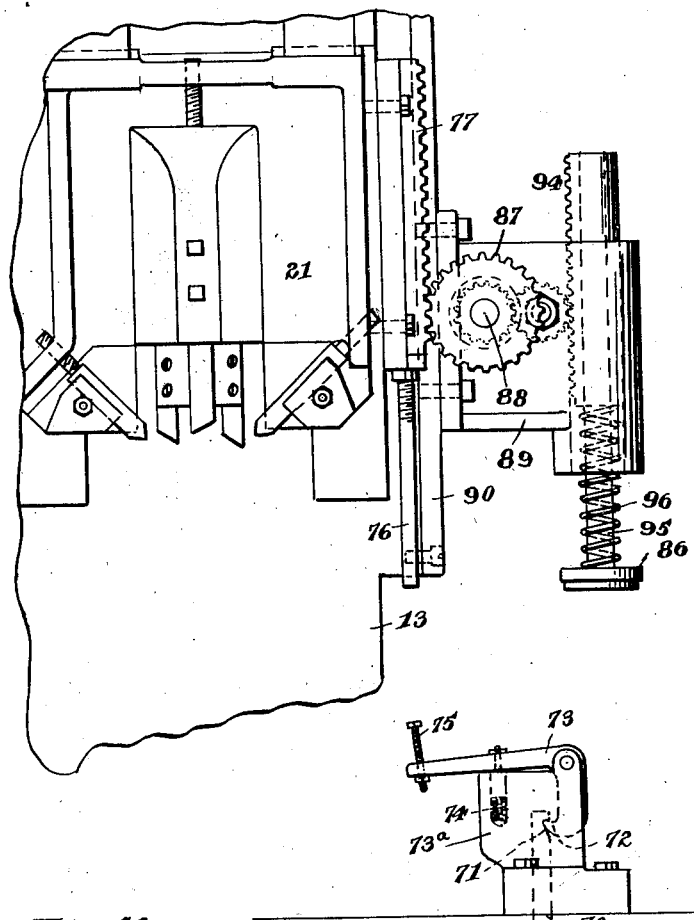
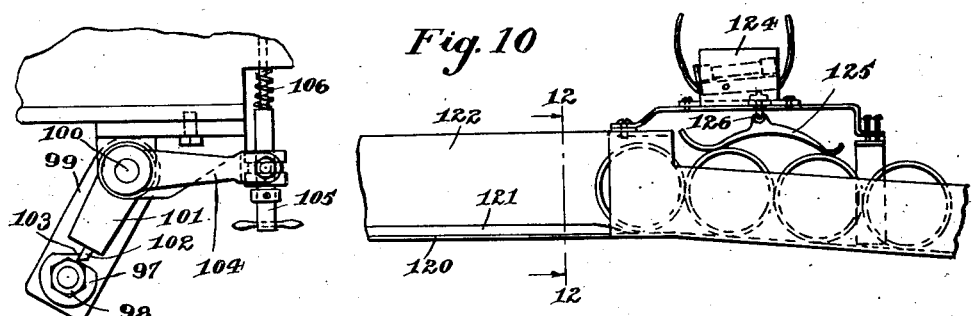
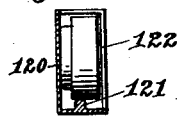
INVENTOR.
Edward P. Bullard
BY
Chamberlain + Newman
ATTORNEYS.

Patented Dec. 8, 1931

1,835,591

UNITED STATES PATENT OFFICE

EDWARD P. BULLARD, OF FAIRFIELD, CONNECTICUT, ASSIGNOR TO THE BULLARD COMPANY, OF BRIDGEPORT, CONNECTICUT, A CORPORATION OF CONNECTICUT

AUTOMATIC WORK FEEDING AND CHUCKING MEANS FOR MULTIPLE SPINDLE LATHES

Application filed December 5, 1929. Serial No. 411,830.

This invention relates to new and useful improvements in automatic work feeding, chucking and discharging means for a multiple spindle lathe of the Mult-au-matic type.

The invention includes a hopper in which work pieces to be turned are placed and from which such pieces are automatically fed in consecutive orders to the respective work spindles of the lathe, and upon each of which spindles, a work piece is chucked for turning operations, at the various stations. The several spindles are vertically mounted in a rotatable carrier to which is imparted a step by step rotary movement that serves to carry the work from one set of tools to the next for different turning operation. The invention further comprises chuck releasing means whereby the respective chucks and work pieces carried thereon are released as the turning operations are completed. It also embodies means for automatically discharging the work when released from the chuck and machine simultaneous with the placing of another piece on the preceding chuck of the carrier.

The invention as illustrated in the accompanying drawings is applied to a commercial type of multiple spindle lathe similar in all essentials to that shown in patent to Bullard and Stevens, No. 1,258,089 of March 5, 1928, and which includes a rotatable carrier that is intermittently indexed to convey the work from one set of tools to another. The tools for operation upon the work are carried in tool slides that are arranged for both vertical and horizontal transverse and feeding movements in a way to adapt them for performing various turning operations. These tool slides are each adapted to carry one or more tools dependent upon the particular work to be performed. The machine shown in the patent is a six spindle machine, whereas that herein illustrated is but a four spindle machine, the principle of operation is the same, however, in both instances.

The machine shown in this application includes a base, a central column, a rotatable carrier mounted to turn upon the base and with respect to the column. The carrier is provided with a series of work spindles adapted to rotate upon vertical axes and provided with a changeable speed driver for rotating the spindles at variable and independent speeds. The tool slides, of which there are but three in the present instance, are mounted for sliding movement upon the fixed column above the respective work spindles when in operative position. The rotatable chuck spindles are moved with the successive rotations of the carrier from one station to another so as to bring the work carried by the chucks into operative position with respect to the tools of the tool slides for performing the several operations at the different stations.

Heretofore, it has been the custom with this type of machine to perform the loading and unloading operations entirely by hand, the said performance being accomplished at what is known as the loading station, namely, a station where there are no cutting tools and where the work spindle remains idle, during the working periods of the remaining several work spindles. Automatically operated chucks are used on these types of machines for securing the work in the chucks of the spindles and for releasing it therefrom so that the operator was required only to remove the finished piece and to replace it with a new piece, to be turned, so that it can be chucked in readiness for movement to the respective work stations.

The present invention provides what might be termed a hopper feed which is entirely automatic in its performance and especially well adapted for the handling of relatively small pieces and in practice work out very nicely and to the extent that an increased production is obtained with an accompanying saving of labor operating costs per machine. The invention is applicable to other forms of vertical types of multiple spindle machines and its usefulness is therefore not necessarily confined to this particular form of Bullard machine; therefore, the machine herein shown is but illustrative of a type of machine to which the invention is applicable.

The invention further resides and consists in the novel construction, arrangement and combination of parts shown upon the accompanying drawings forming a part of this specification and upon which Fig. 1 shows perspective view of the invention as applied to a Bullard Mult-au-matic type of machine;

Fig. 2 shows a central vertical section through the mult-au-matic machine shown in Fig. 1, the hopper feeding device being omitted;

Fig. 3 shows a sectional plan view, illustrating the hopper feeding device in plan, and the multiple spindle lathe in sectional plan on the line 3—3 of Fig. 2;

Fig. 4 is an enlarged plan view of feeding device for moving the work pieces forward over and for passing on the chuck jaws;

Fig. 5 is a cross section taken on line 5—5 of Fig. 4;

Fig. 6 shows an enlarged front elevational view of portions of the machine, including the column, the carrier, a chuck, and applied work feeding means as seen from the left of Figs. 1, 2 and 3;

Fig. 7 is a similarly enlarged sectional elevation, taken on line 7—7 of Fig. 3 better to illustrate the chuck opening and closing mechanism;

Fig. 9 shows a detail side elevation as seen from the left of Fig. 6 illustrating the means for setting the work piece in the chuck at the loading stations;

Fig. 10 shows an enlarged front elevation of the means shown in Fig. 1 for operating the electrical switch for controlling hopper feeding means;

Fig. 11 shows a detail plan view of automatic stop mechanism as seen from top of Fig. 6; and Fig. 12 is a vertical cross section taken on line 12—12 of Fig. 11.

Figure 1:
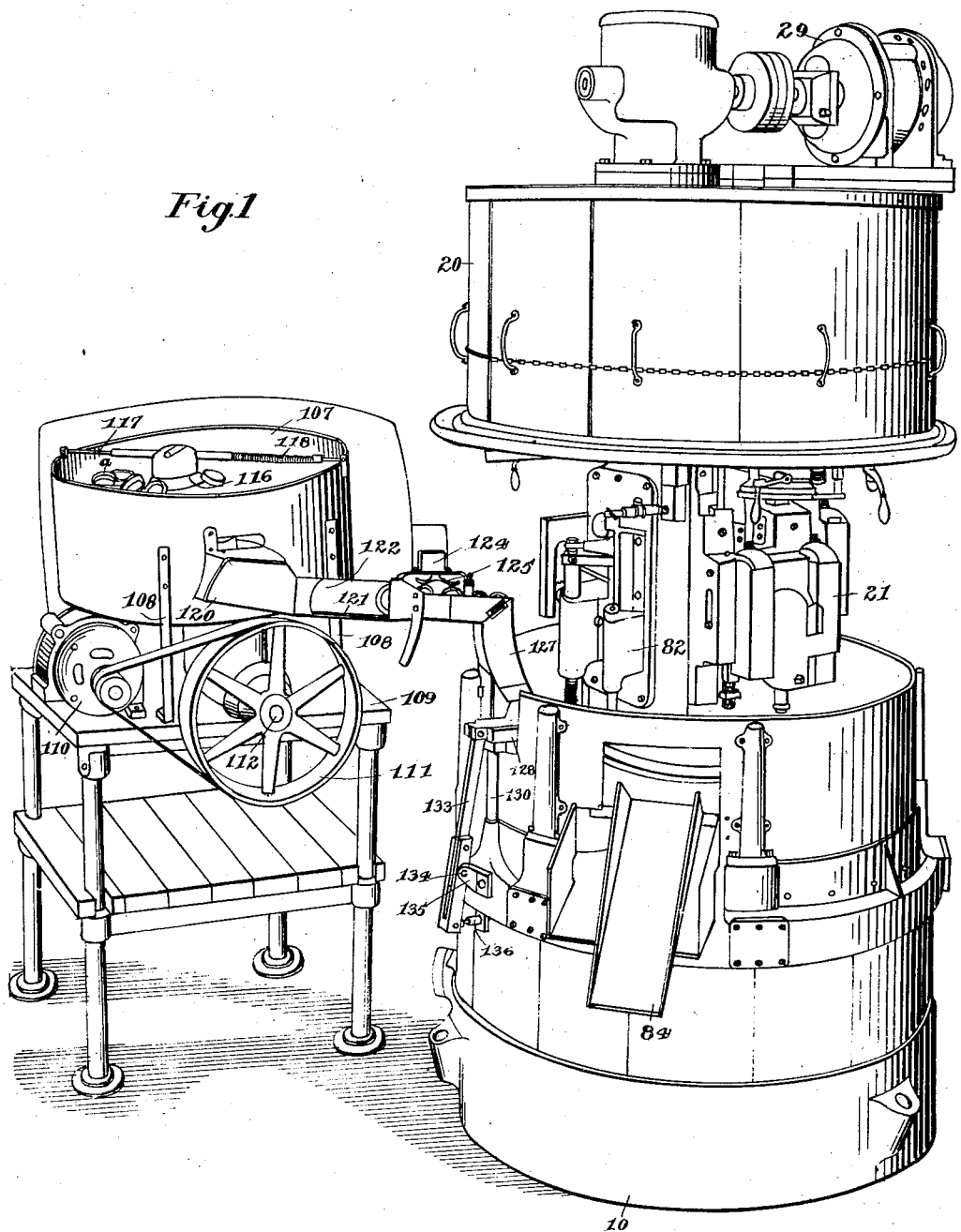

In the drawings 10 represents the base of the lathe having an annular supporting track 11 in which is formed a raceway to contain a series of balls that form bearings for the rotatable carrier 12 mounted to turn upon the base and around the column 13 which forms a simple support for the several tool slides mounted thereon and the feed-works carried in the upper part of the machine.

In the annular carrier is mounted a series of, preferably four, vertical work spindles 14, each including a work table or chuck 15 on their upper end, and each provided with a gear 16 upon their lower end portions. These gears are the means through which the spindles are driven when the carrier is stationary and the spindles positioned at their several operating stations. These spindles are each operated through separate slip-gears 17 mounted on vertical shafts 18 connected with and driven by the respective feed-works 19 contained within the upper inclosure 20 of the machine. The three sets of feed-works, which are alike in construction, serve to operate the three tool slides 21 to which is imparted both vertical and horizontal movements to feed the tools carried in the slides in a manner to operate upon the work chucked in the work tables when rotatably positioned beneath the tool slides.

In practice these work-tables are designed to rotate only when the carrier is at a position of rest and remains idle during the indexing operations, which rotate the carrier to move the tables from one work station to another.

The indexing operations of the carrier is performed in the present instance by an indexing arm 22 that is pivotally hung upon a crank arm 23 journaled in the base and provided with gear connections 24 whereby the crank shaft and its indexing arm are operated from a central main shaft 25. The inner end of the indexing arm is guided in its reciprocatory movements by a shoe 26 that is pivotally mounted in a socket 27 formed beneath and in alignment with the said main shaft. The action therefore of the indexing arm, when the main shaft is operated, is to oscillate and swing out and forward to successively engage the roll 28 on one of the four brackets secured to the underside of the carrier member 12ª positioned between the spindles 14, in a way to move the table and carrier forward a predetermined distance.

The main shaft as well as the other operative parts of the machine may derive their power from a motor 29 positioned on the top of the machine and geared to operate the driving shaft 30 upon which a clutch member 31 is slidably mounted. This upper clutch member 31 is provided with operating means whereby it may be made to engage and disengage the lower clutch member 32 on the driven shaft 33 for the purpose of operating the machine. The operating means for these clutches include an arm 34 and a rocker shaft 35 having an extended arm 36 that is connected to operate by a sleeve 37 adapted to slide up and down upon the driving shaft 30 to operate the clutch member. The lower driven shaft 33 carries a gear 38 connected to operate the gear 39 through which power is applied to the series of three feed-works 19 mounted in the upper compartment of the machine. This large gear 39 is mounted upon a bearing 40 secured to a plate 41 upon the upper end portion of the column 13. This bearing 40 is provided with a central bore in which an upper central hollow shaft 42 is journaled in alignment with the before mentioned central shaft 25 that serves to operate the carrier through the controller drum 43 and the feed works as will again be referred to. The shaft 25 is driven from the shaft 33 through gear connections 44 with shaft 45 and gear connections 46 with shaft 47, geared to drive the gear clutch member 48 loose upon the shaft 25. The controller 43 splined to the shaft 25 is provided with clutch connections 49 for engagement with the member 48 so that the said controller 43 and the shaft may be made to turn with the drive member 48 as is desired for the purpose on indexing the carrier. Each set of feed-works 19 includes a depending shaft 50 which is operated at certain intervals and carries an arm 51 to engage the lugs on the controller drum 43 in a way to engage and disengage the drum wth the gear clutch member 48 so as to operatively engage and disengage with the shaft 25 for the purpose of operating the spindles and tool slides.

When the carrier comes to a position of rest and the work-tables begin to rotate, the several feed-works operate to simultaneously start all the slides down, and upon the completion of their respective cutting operations, automatically return to their upper normal position in their respective orders of completion of the work.

The work to be turned is necessarily cylindrical in form and may include several annular surfaces to be finished. These pieces, aside from being fed into and removed from the machines, have to be securely chucked for operations thereon and likewise quickly released and discharged from the chucks when finished preparatory to the chucking of a new piece of work in same chuck.

Figure 8:
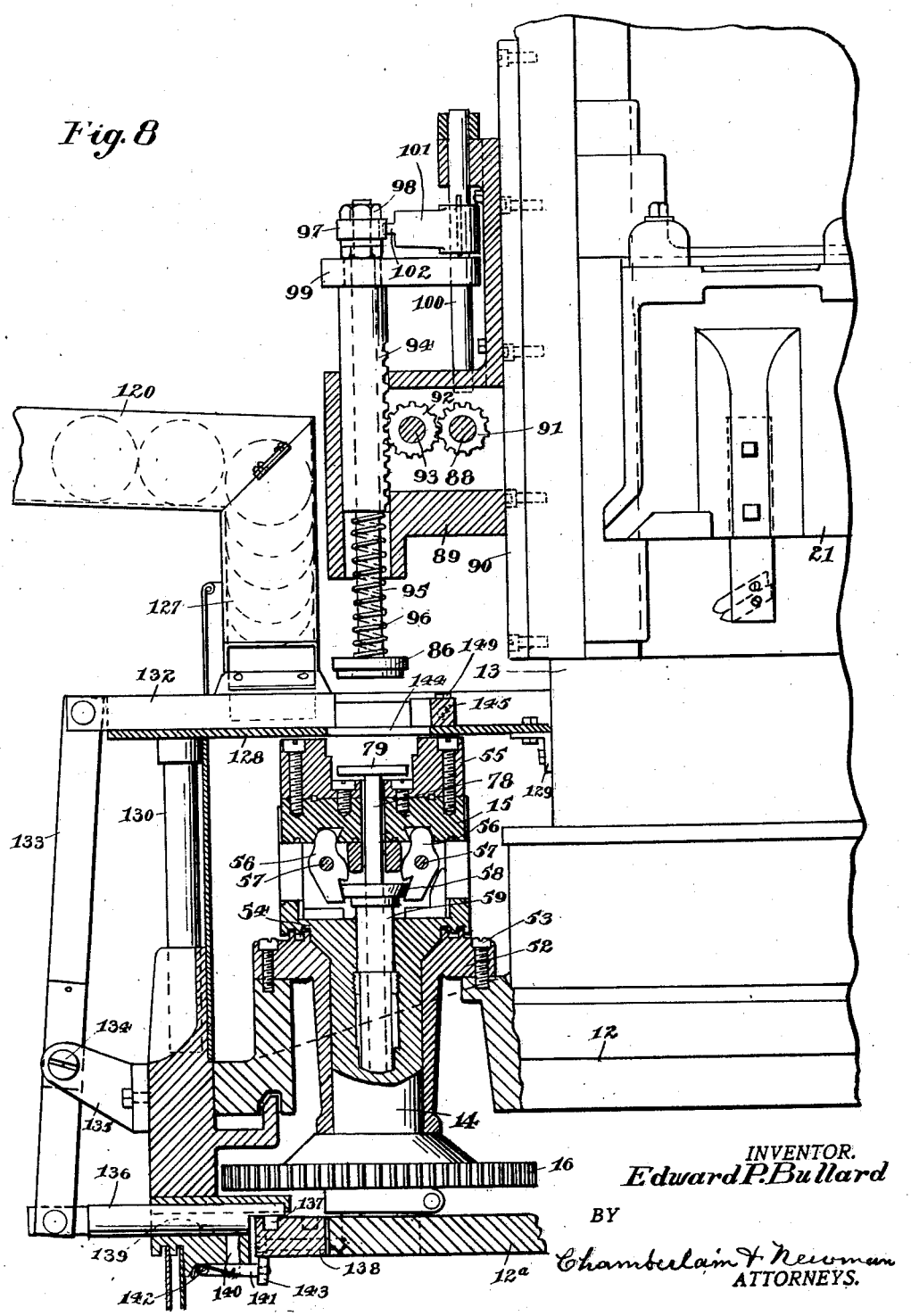
Fig. 8 shows a sectional elevational view taken on line 8—8 of Fig. 6.

This automatic chucking means will be best understood from Figs. 7 and 8 and comprises the following:

The carrier 12 is provided with a series, one for each spindle, of vertically disposed tubular bearings 52 that are secured in the top of the carrier by means of screws 53. A rotatable chuck spindle 14 is mounted in the bearings and is provided at its upper end with an enlarged head 54 having a tapered underside to engage a corresponding annular conical shaped bearing in the bearing 52. The before mentioned gear 16 is mounted on the intermediate portion of this spindle and serves to drive the same. The spindles are also journaled in a second member 12ª of the carrier 12.

Suitable chuck jaws 55 are slidably mounted in the top of the head of the spindle and are connected to be operated by short vertically disposed levers 56 which are hingedly mounted upon pins 57, the upper ends of the said levers being in engagement with the holes on the under side of the chuck members, while the inner lower faces of the levers are slidably engaged by cam faces 58 on the vertically adjustable sleeve 59 that is mounted for slidable movement within the hollow work spindle. The lower end of this sleeve is provided with an internal thread for the connection to the upper end of a relatively long hollow shaft 60 which is also adapted for vertical slidable movement. A spring actuated slidable sleeve 61 is secured to the lower end portion of the chuck spindle 14 and is keyed to slide thereon. A spring 62 is positioned within the sleeve 61 and between the end of the chuck spindle and the lower end of said sleeve to normally hold the sleeve and hollow shaft in their lowermost positions which, through the action of the lever 64, serve to hold the chuck jaws in a closed position to clamp a piece of work therein as shown in dotted lines, Fig. 5. The sleeve 61 is provided with an annular groove 63 to receive rollers 65 carried by the lever 64 hingedly supported to a hanger 66 secured to the under side of the carrier member 12ª. The lever 64 includes a depending arm in which a roller 67 is carried for the purpose of engaging a cam runway 68 supported on posts 69 mounted in the base of the machine. This cam serves to raise the lever 64 upon its pivot carrying with it the connected sleeve, the action of which is to open the chuck jaws and further serves to raise the trigger rod 70 mounted for slidable movement in the members 12 and 12ª of the carrier so that its notch 71 is moved into position to be engaged by the hook end 72 of the bell crank lever 73 pivotally supported in a bracket 73ª secured to the table of the carrier.

A spring 74 is positioned in a hole of the bracket 73ª and serves to act upon a piston slidably mounted in the hole and secured to the longer arm of the bell crank lever, the purpose of this spring is to normally hold the hook end of the lever in engagement with the trigger rod 70. An adjustable screw 75 is carried in the long arm of the bell crank lever for engagement by the lower end of a rod 76, see Fig. 9, carried by a slide rack 77 mounted on the tool slide 21 for reciprocatory movement on the column of the machine as will be again referred to. In this connection it should be borne in mind that the lever 64 and its connected parts travel with the carrier and in an annular path, while the cam 66 of which there is but one, is stationary and serves to be engaged by the rollers of the traveling lever 64 as they approach the loading station. In this connection we provide in the chuck spindle a lift rod 78 upon the upper end of which is a head 79 that normally rests in the space between the chuck jaws. This head is so positioned that when raised, it will engage the under face of the work-piece and shove it up from between the jaws while the latter are open. This leaves the work-piece in position to be further shoved aside by the stripper 80 mounted upon the lower end of a rocker shaft 81 journaled in a bracket 82 and provided with a spring 83 that tends to hold the arms of the strippers in their normal position. This stripper includes a long and a short arm, the former to engage the work and slide it into the chute 84 when actuated by posts 85 carried on the carrier for engagement with the short arm of the stripper. The lower end portion of the lift rod 78 is exposed and positioned to travel in substantially the same path as the roller 65 and thus engages and rides upon the cam 66 immediately following the travel of the roll 65 so that the action of this lift rod to raise the work piece is secondary and immediately following the opening of the chuck for the releasement of the work. The operation of the chuck for clamping the work-piece between the chuck jaws is accomplished at the loading station shown in Fig. 2 and at the left in Fig. 3 at which station and time the chuck jaws are open, see Fig. 8, in readiness to receive a piece of work as it is fed thereto from the hopper through the feeding mechanism, later to be described.

It will be understood from Fig. 5 and the connection of the lever 64, that the latter is held in its upper position by the trigger mechanism 70 and serves to also hold the sleeve and hollow shaft in their raised positions and the chuck jaws open. The parts remain in this position while the new piece to be turned is being positioned therein but is automatically released for the chucking of the piece with the down feed of the tool slide 21, see Fig. 4, positioned on another quarter or side of the column and as before described in its vertical movements. The before mentioned racks 77 are mounted on the tool slides and each carries with it in its vertical movements the attached rod 76 which in turn operates the bell crank lever to release the arm 64 for operating and closing the chuck jaws. The rack 77 further serves to operate the positioner 86 which is brought down upon the work piece to shove it into correct position between the jaws just preceding the closing operation of the jaws so as to insure the correct positioning of the piece therein. The rack 77 engages a gear 87, see Figs. 4 and 7, that is mounted upon a shaft 88 and is journaled in the bracket 89 secured to the closure plate 90 on the face of the column. This shaft also carries a smaller pinion 91 upon its inner end that meshes with and turns a second small pinion 92 secured to a short shaft 93 that is also journaled in the bracket 89 and engages a vertically reciprocatory rack 94 having a central longitudinal hole therein to slidably receive the shank 95 of the before mentioned positioner 86. A spring 96 is positioned on the shank between the positioner and rack to yieldably hold the positioner in its downwardly extended position.

From the foregoing it will be seen that with the downward movement of the tool slide positioned next in advance of the loading station, the rack and gear connections move the positioner down in a manner to yieldably engage the work-piece and shove it in position between the chuck jaws, to be clamped, and that with the return movement of the same slide and rack, the positioner will be raised from the chucks which close against the work in preparation for the indexing operation of the carrier.

In this connection safety means is provided for automatically stopping the machine in case of an accident, such as the wrong placing of a work-piece in a chuck, in order to avoid breaking the machine or damaging the tool. This safety means consists in extending the shank through the rack and providing a collar 97 upon its upper threaded end by means of nuts 98 and is thus under certain conditions free to move independent of the rack. A bracket 99 is secured to the upper end portion of the rack and is fitted to slide on a rocker shaft 100 mounted in the bracket 89 secured to the column. An arm 101 is keyed to slide upon the rocker shaft 100 and carries a projected lug 102 for frictional engagement with a similar cam lug 103 on the before mentioned collar 97 carried by the rack 94. The rocker shaft 100 carries an arm 104 that is pivotally connected to a safety stop 105, the inner end of which is in engagement with internal operating mechanism of the machine. This stop is provided with a spring 106 that normally tends to hold it in, and further includes a handle whereby it is manipulated, when not using the hopper feed. The pressure of this spring causes an engagement of the lugs 102 and 103 sufficient to carry the shank 95 and its positioner with the movement of the rack 94, unless the latter meets with unusual resistance, caused possibly by a misplaced or an imperfect work-piece. In the latter case, as of a misplaced work-piece and the resultant extra resistance to the positioner and its shank in their downward movement, the collar and its lug 103 are shoved up past the lug 102 of the arm 101 thus releasing it, leaving the spring 106 free to act to draw the safety stop 105, to automatically stop the machine.

I will next describe the feeding mechanism for automatically feeding the pieces of work from a hopper 107 to the loading station. In this connection it will be seen that the hopper for receiving the work pieces is supported by legs 108 upon a table 109. A motor 110 is also mounted upon this table and is belted to drive a pulley 111 upon a horizontal shaft 112 positioned beneath the hopper and geared to a vertical shaft that is connected to rotate a large disk 113, covering the bottom of the hopper, for the purpose of agitating the work-pieces contained therein. This disk carries a cam 114 mounted concentric therewith for the purpose of engaging a pin 115 upon the under side of conical shaped agitator 116 that is slidable upon a fixed rod 117 mounted in the sides and transversely of the hopper. A spring 118 is positioned upon the rod, one end being connected to the rod and the other to a sleeve of the agitator in order to hold the pin 115 of the agitator against the cam 114 in a way to insure crosswise radial movements of the agitator during the rotary movements of its disk 113 which obviously serves to keep the work-pieces $a$ stirred up in a manner to prevent clogging and insure feeding from the hopper into the runway. The work pieces are thus moved down flatwise beneath the shield 119, shoved out in a vertical position into the inclined runway 120 secured to the outer surface of the hopper so that they will roll down the runway toward the mechanically operated feeding device which transfers the work from the runway to the chuck jaws. If the work pieces to be operated upon have two diameters to be turned, as is the case with the pieces shown herein, it is necessary that they approach the feeding device in uniform relative positions, that is so that all the pieces will be presented top side up. In order to insure this uniform positioning of the pieces in their travel through the runway to the feed, I provide a single track or strip 121 in the bottom of the runway slightly closer to the closed side so that the work, if wrongly placed, will bear against the front side and when it reaches the opening 122 in the front side of the runway, it will fall out into a container 123, from which the pieces may be again put back into the hopper. Those of the work pieces which enter the runway in proper position continue to roll by the opening and line up in the lower end of the runway, there being a sufficient number of pieces fed from the hopper to the runway to insure the keeping of the lower end of the same filled at all times.

The hopper feeding means as designed serves to feed the work pieces faster than the lathe can turn them, consequently I provide means for starting and stopping the feeding means as required, in the form of an automatic device 124 which is secured to the runway and includes a yoke 125 which is pivotally hung as at 126 and is designed to be at all times in engagement with at least two of the work pieces so long as they continue to roll therebeneath.

The runway, for the most part, is straight as shown in Fig. 3 but includes a right angle bend with a depending curved portion 127 that conveys the pieces by gravity to a trough 128, one end of which is supported on a bracket 129 attached to a column 13 and the other end on a post 130 supported on the bed of the machine. A longitudinal guideway 131 is secured in the bottom of the trough upon which a slide 132 is mounted for reciprocatory movement to move the work pieces forward over the chuck jaws of the work spindles as they are brought forward. The outer end of this slide is hingedly connected to a lever 133 which is pivotally connected as at 134 to a bracket 135 secured to the before mentioned post 130. This pivoted lever and its slide are operated through a slide link 136 slidably mounted in the bed and bearing a roller 137 upon its inner end that is engaged by cam grooves in the four cam pieces 138 secured to the member 12$^a$ of the rotatable carrier. The slide link 136 is provided with a socket 139 to be engaged by a pin 140 carried by a spring actuated arm 141 hingedly supported as at 142 and carrying a roller 143 upon its free end to be engaged by said cam pieces 138 on the member 12$^a$ of the carrier so that the slide link 136, its connected lever and feed slide will be locked in an open position to receive the work piece except when desired to operate said parts. The trough 127 is provided with an opening 144 in its bottom through which the work pieces are passed to the chuck jaws. Adjacent this opening a stop 145 that is provided with three springs 146, 147 and 148 is secured to the bottom of the trough by screws 149. From the foregoing it will be seen that as the slide is shoved forward, it will shove forward a work piece and position it in between the three springs 146, 147 and 148 which serve to hold it above the chuck jaws and in position to be engaged and shoved down between the jaws by the positioner, which jaws close in against the sides of the said work pieces to hold the same.

Having thus described my invention, what I claim and desire to secure by Letters Patent is:

1. In a multiple spindle lathe, a rotatable carrier, a series of chucking spindles carried thereby, a longitudinally movable hollow shaft extending through each spindle and having means upon its upper end connected with the chucks for opening and closing the same, a lever associated with the lower end of each spindle to operate the chucks in one direction, a spring intermediate the spindle and shaft for operating the chuck jaws in opposition to the operation of the lever, fixed cam means positioned in the line of travel of said spindles, and lever for operating the latter against the action of said spring.

2. In a multiple spindle lathe, a rotatable carrier, a series of chucking spindles carried thereby, tool slides, a hollow shaft extending through the spindle and having means upon its upper end connected with the chucks for opening and closing the same, a lever beneath the carrier connected with the chuck operating shaft for raising the same, a spring intermediate the spindle and shaft for closing the chuck jaws in opposition to the operation of the lever, fixed cam means positioned in the line of travel of said spindles, levers for operating the latter against the action of said springs, a holding device connected with said levers to hold the same in an operated position, and means carried by the slides for engagement with said holding means and for the releasement of the lever and chucks.

3. In a lathe, a rotatable carrier, a rotatable chucking spindle, chuck jaws carried upon the spindle, a hollow shaft within the spindle adapted for longitudinal movement, connections intermediate the upper end portion of the shaft and the chuck jaws for operating the latter, a spring actuated sleeve secured to the lower end of said hollow shaft and slidably mounted upon the chuck spindle for normally holding the shaft and jaws in a normal position, a lever connected with the sleeve, a fixed cam in the path of travel of said lever for operating the same in a way to operate the shaft and jaws against the force of the spring actuated sleeve.

4. In a lathe, a rotatable carrier, a chuck spindle, a hollow shaft within the spindle adapted for longitudinal movement, connections intermediate one end portion of the shaft and the chuck for operating the latter, a spring actuated sleeve secured to said hollow shaft and slidably mounted upon the chuck spindle for normally holding the shaft and chuck in a normal position, a lever connected with the sleeve, a fixed cam in the path of travel of said lever for operating the same in a way to operate the shaft and chuck jaws against the force of the sleeved spring, and an ejector shaft mounted within the hollow shaft, its one end portion being disposed between the chuck jaws for the engagement and removal of the work piece its other end exposed beyond the end of the work spindle for engagement with the said cam immediately following the engagement of the lever.

5. A multiple spindle lathe, including a base and column, a carrier rotatably mounted thereon, indexing means for the carrier, a series of rotatable work spindles mounted in the carrier, tool slides, means for feeding pieces of work to each spindle when positioned at a loading station, a work positioning device mounted upon the column, means connected with a tool slide for operating the positioning device.

6. A multiple spindle lathe, including a base and column, a carrier rotatably mounted thereon, indexing means for the carrier, a series of rotatable work spindles mounted in the carrier, tool slides, means for feeding pieces of work to each spindle when positioned at a loading station, a work positioning device mounted upon the column, means connected with one of the tool slides for operating the positioning device, stop mechanism for the carrier connected to be operated by the positioner upon its failure to properly function to position a work piece.

7. A lathe including a work spindle, chuck carried thereby, a column, a work positioning device carried by the column and adapted to operate to and from the chuck, gear connections therewith, a tool slide, a rack upon the tool slide to engage and operate the said gears to operate the positioning device.

8. The combination of a multiple spindle lathe of the class described, including a rotatable carrier, a plurality of chucking spindles mounted therein, a column, a work-positioning device carried by the column and adapted to operate to and from the chucks, gear connections therewith, a tool slide, a rack upon the tool slide to engage and operate the said gears, and an automatic stop for the lathe connected to be operated by said positioner rack for stopping the machine by unusual resistance to the spring actuated positioner.

9. The combination of a multiple spindle lathe including a base, a column, a rotatable carrier, means for rotating the carrier by a step-by-step movement, a series of rotatable chucking spindles mounted in the carrier, a rack slidably mounted on the column, a positioner yieldably mounted in the rack, means for operating the rack, and an automatic stop mechanism for the lathe connected to be operated by the positioner upon its failure to position a piece of work in the chuck jaws.

10. The combination of a multiple spindle lathe, including a rotatable carrier, means for indexing the carrier, a series of rotatable chucking spindles mounted in the carrier, means for feeding pieces of work to the chucks, comprising a trough positioned above the line of travel of the chucks, a reciprocatory slide mounted within the trough, a lever connected with the slide to reciprocate the same, a cam mounted upon the carrier, a link connecting the lever, and a cam for operating the latter through the movement of the former and the carrier.

11. The combination with a multiple spindle lathe, including a rotatable carrier, a plurality of chucking spindles mounted in the carrier, of means for feeding pieces of work to the chucks, comprising a trough positioned above the line of travel of the chucks, a reciprocatory slide associated with the trough, automatic means intermediate the carrier and slide for operating the latter, a lever connected with the slide to reciprocate the same, a cam mounted upon the carrier, a link connecting the lever and cam for operating the latter through the movement of the former and the carrier, a hopper for receiving work pieces, and means for feeding said work pieces from the hopper to the trough.

12. The combination with a multiple spindle lathe, including a rotatable carrier, a series of rotatable chucking spindles mounted in the carrier, of means for feeding pieces of work to the chucks, comprising a trough positioned above the line of travel of the chucks, a reciprocatory slide mounted within the trough, automatic means intermediate the carrier and slide for operating the latter, a lever connected with the slide to reciprocate the same, a cam mounted upon the carrier, means connecting the lever and cam for operating the latter through the movement of the former and the carrier, a hopper for receiving work pieces, means for feeding said work pieces from the hopper to the runway, and means for ejecting such work pieces from the runway which may be improperly positioned so as to prevent them from passing along to the chucks.

13. A machine of the class described including a rotary carrier, a plurality of chucking spindles mounted in the carrier, a lesser number of tool-holder slides to provide a loading station, means for indexing the carrier, a fixed trough above the loading station of the chucking spindles having an opening through its bottom portion, springs positioned in the trough to receive and hold the work pieces above the opening, means for feeding the work pieces forward between the springs, a runway for guiding pieces of work to the trough, and a positioner above the loading position of the chucking spindles to shove the work pieces from the springs to between the chuck jaws.

14. The combination with a multiple spindle lathe, of an automatic work feeding means comprising a hopper having a rotatable bottom, a cam, an agitator, springs means for normally holding the agitator against the cam so as to be operated thereby to remove the work pieces from the hopper, a runway to receive the work pieces, and means for receiving said work pieces and positioning them over the chucks of the spindles.

15. The combination with a multiple spindle lathe, including a rotatable carrier, a series of chucking spindles carried thereby, of an automatic work feeding device including a runway, a hopper for containing work pieces, means for operating the hopper to feed the work pieces to a runway including an electric motor, an electric contacting means positioned in the path of travel of the work pieces and connected with the electric motor and adapted to start and stop the same by the absence and movement of work pieces through the runway.

16. A machine of the class described including a rotary carrier, a plurality of chucking spindles mounted in the carrier, a lesser number of tool-holder slides to provide a loading station, means for indexing the carrier, operating means within the spindles for opening and closing the chucks, comprising a longitudinally movable hollow shaft, spring means to operate the shaft to close the chuck, lever means on the carrier to operate the shaft and chuck against the action of the spring, cam means adjacent the loading station to be engaged by the lever means for opening the chucks, and additional means for automatically closing the chucks as they leave the loading station.

17. A machine of the class described including a rotary carrier, a plurality of chucking spindles mounted in the carrier, a lesser number of tool-holder slides to provide a loading station, means for indexing the carrier, operating means within the spindles for opening and closing the chucks, comprising a longitudinally movable hollow shaft, spring means to operate the shaft to close the chuck, lever means on the carrier to operate the shaft and chuck against the action of the spring, cam means adjacent the loading station to be engaged by the chuck operating means for opening the chucks, automatic means for placing pieces of work in the chucks when at the loading station.

18. A machine of the class described including a rotary carrier, a plurality of chucking spindles mounted in the carrier, a lesser number of tool-holder slides to provide a loading station, means for indexing the carrier, operating means within the spindles for opening and closing the chucks, comprising a longitudinally movable hollow shaft, spring means to operate the shaft to close the chuck, lever means on the carrier to operate the shaft and chuck against the action of the spring, cam means adjacent the loading station to be engaged by the lever means for opening the chucks, automatic means for removing pieces of work from the chucks as they approach the loading station.

Signed at Bridgeport, in the county of Fairfield and State of Connecticut, this 3rd day of December, A. D. 1929.

EDWARD P. BULLARD.